United States Patent [19]

Pugh

[11] Patent Number: 5,018,353
[45] Date of Patent: May 28, 1991

[54] CENTER COMPENSATING MASTER CYLINDER

[75] Inventor: Cecil C. Pugh, Kettering, Ohio

[73] Assignee: General Motors Corporation, Detroit, Mich.

[21] Appl. No.: 331,930

[22] Filed: Apr. 3, 1989

[51] Int. Cl.[5] .............................................. B60T 11/20
[52] U.S. Cl. ........................................ 60/562; 60/589; 60/592
[58] Field of Search ................ 60/533, 562, 585, 589, 60/592

[56] References Cited

U.S. PATENT DOCUMENTS

| | | | |
|---|---|---|---|
| 3,068,651 | 7/1960 | Shutt | 60/562 |
| 3,659,421 | 5/1972 | Wilson et al. | 60/562 |
| 4,550,567 | 11/1985 | Schaefer | 60/562 |
| 4,553,395 | 11/1985 | Price et al. | 60/589 |
| 4,621,498 | 11/1986 | Schaefer | 60/562 |
| 4,707,989 | 11/1987 | Nakamura et al. | 60/562 |

FOREIGN PATENT DOCUMENTS

| | | | |
|---|---|---|---|
| 693132 | 8/1964 | Canada | 60/562 |
| 486615 | 8/1938 | United Kingdom . | |
| 941340 | 8/1961 | United Kingdom . | |
| 1002251 | 6/1962 | United Kingdom . | |
| 986175 | 1/1964 | United Kingdom . | |
| 1215055 | 5/1968 | United Kingdom . | |
| 2098294A | 11/1982 | United Kingdom . | |
| 2098294 | 11/1982 | United Kingdom | 60/592 |
| 2207967A | 8/1988 | United Kingdom . | |
| 2209198A | 8/1988 | United Kingdom . | |
| 2211567A | 10/1988 | United Kingdom . | |
| 2219369A | 5/1989 | United Kingdom . | |

Primary Examiner—John T. Kwon
Assistant Examiner—F. Daniel Lopez
Attorney, Agent, or Firm—Ernie E. Helms

[57] ABSTRACT

A dual chamber master cylinder has a center compensating valve for bypass compensation of the secondary pressurizing chamber, eliminating lip seal damage to the secondary piston seal that can occur when a bypass port is provided in the wall of the secondary pressurizing chamber.

3 Claims, 1 Drawing Sheet

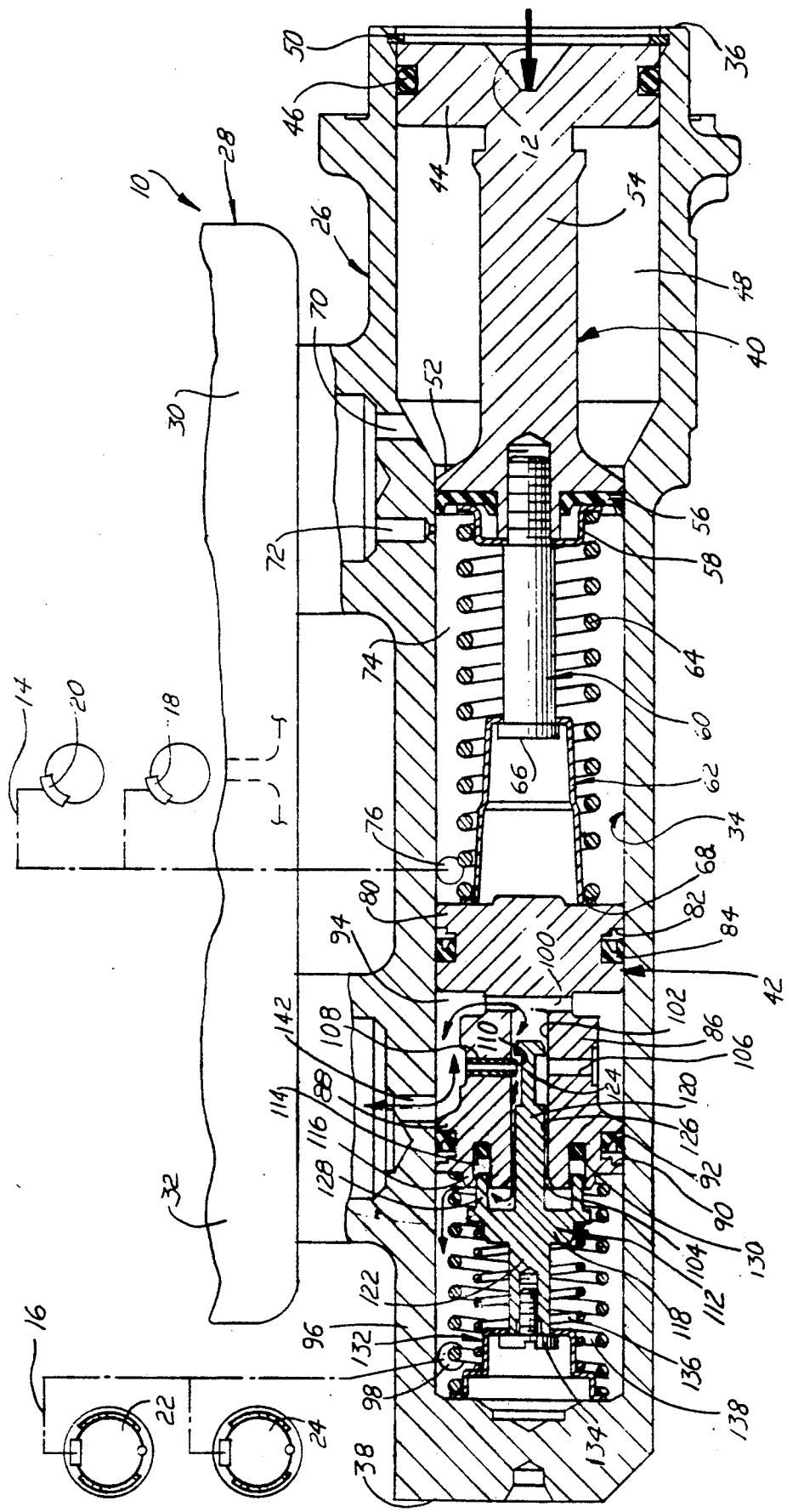

CENTER COMPENSATING MASTER CYLINDER

BACKGROUND OF THE INVENTION

Typical master cylinders in use in automotive vehicles for many years are of the dual or tandem type; that is, they have two pressurizing chambers in a common bore having a closed end and an open end, with brake fluid being pressurized by a primary piston and a secondary piston arranged in tandem in the bore. One of the chambers is typically connected to one brake circuit, such as one containing the vehicle front brakes, and the other chamber is typically connected to another brake circuit containing the vehicle rear brakes. At times other circuit arrangements, and even additional pressurizing chambers, are used.

Such a master cylinder usually has a pair of holes in the main body adjacent each of the primary and secondary piston seals. The holes are connected with the master cylinder reservoir and extend to the bore. One of the holes is a compensating port located behind the seal of the associated piston. The other hole is a bypass hole positioned in front of the seal of the associated piston. When the master cylinder is actuated, the seals move across their respective bypass holes so that these holes are no longer fluidly connected with the pressurizing chambers, and the brake fluid in those chambers and the brake circuits connected with them can be pressurized to actuate the brakes. These seals are usually cup-like or V-block seals with lips which are subject to seal extrusion into the bypass holes under some conditions, resulting in damage to the seal and loss of full functioning pressure generation for the brake circuit associated with the damaged seal. In normal service braking operation, there is little pressure in the pressurizing chambers until the bypass holes are closed, so extrusion into those holes is minimized. However, with the advent of systems variously referred to as anti-lock, anti-skid, wheel lock control, or anti-block systems the modulation of brake pressures in the brake circuits when that type system is operating can cause rapid travel of the secondary piston seal back and forth across the front bypass hole. That is the bypass hole associated with the forward pressurizing chamber in the master cylinder bore.

SUMMARY OF THE INVENTION

Structure embodying the invention eliminates the usual front bypass hole over which the secondary piston pressure seal must pass, thereby obviating the possibility of damage to that seal because of extrusion into such a bypass hole. The invention provides an internal path for brake fluid compensation and bypass, this being referred to herein as center compensation. It includes a valve located on the secondary piston within the master cylinder bore. The valve is open while the master cylinder is at the rest or released position, and is closed by actuating movement of the secondary piston. It reopens when the secondary piston is being returned to its rest position.

BRIEF DESCRIPTION OF THE DRAWING

The single FIGURE is a cross section view of a master cylinder assembly embodying the invention, with parts broken away and brake circuits to which the master cylinder is connected being shown schematically.

DESCRIPTION OF THE PREFERRED EMBODIMENT

The master cylinder assembly 10 illustrated is of the tandem type having a quick take-up feature such as that in common use in recent years. The assembly 10 is schematically shown being connected to a master cylinder operator which exerts actuating force typified by the arrow 12, to a vehicle front brake circuit 14 and to a vehicle rear brake circuit 16. Front brake circuit 14 has the two front wheel brakes 18 and 20 arranged to be actuated by hydraulic pressure in that circuit. These brakes are schematically illustrated as being disc brakes which benefit from the quick take-up action of the master cylinder. Rear brake circuit 16 has the two rear wheel brakes 22 and 24 arranged to be actuated by hydraulic pressure in that circuit. These brakes are schematically represented as being drum brakes.

Assembly 10 includes the master cylinder housing or body 26 and the schematically illustrated reservoir 28. The reservoir has a rear compartment 30 and a front compartment 32 which normally contain a supply of hydraulic brake fluid. The compartments may be fluidly separate or interconnected in a manner well known in the art. The body 26 has a stepped bore 34 formed therein which is open at the rear end 36 of the body and is closed at the body front end 38. A stepped primary pressurizing piston 40 is reciprocably received in the rear portion of bore 34 and a secondary pressurizing piston 42 is reciprocably received in the front portion of bore 34.

Primary piston 40 has a rear land 44 provided with a circumferentially extending seal 46. Seal 46 is in slidable sealing engagement with the bore wall. The enlarged rear portion of bore 34 in which piston land 44 and seal 46 are positioned provides a quick take-up chamber 48. A stop 50, shown as a C-ring received in an internal groove at the bore rear end, provides a stop for piston 40 when the master cylinder is at the rest or fully released position shown. This stop, in conjunction with the returning action of the piston return springs noted below, establishes the rest or released positions of the pistons 40 and 42.

Piston 40 has a front land 52 connected with rear land 44 by a reduced diameter piston portion 54. Front land 52 is of smaller diameter than rear land 44, and fits within the smaller diameter part of bore 34 located forward of quick take-up chamber 48. An annular cup-like lip seal 56 fits on the forward face of piston land 52 and is in slidable sealing engagement with the bore wall. An annular seal retainer and spring seat 58 is held in position on the front face of piston 40 by a headed pin 60 extending through the retainer and seat 58 and the seal 56. Another cup-like spring seat and spring retainer 62 is reciprocably mounted on pin 60, which extends part way to the secondary piston 42. The primary piston return spring 64 is a compression coil spring received about pin 60 and most of seat and retainer 62. Spring 64 has one end engaging the spring seat 58 and the other end engaging the seat end of seat and retainer 62. Spring 64 is captured between spring seats 58 and 62 under compression so that it will urge the spring seat and the seal retainer 58 towards the face of seal 56. It also continually urges seat and retainer 62 forward so that the portion thereof in sliding engagement with pin 60 is prevented from moving off of the pin by the pin head 66. The spring seat portion 68 of seat and retainer 62 is normally in engagement with the rear face of secondary piston 42.

A part of the body 26 has a rear compensating port 70 opening into chamber 48 and in fluid communication with the reservoir rear compartment 30. A rear bypass port 72 opens into the smaller diameter part of bore 34 just forward of the at-rest position of seal 56, and provides fluid communication between the reservoir rear compartment 30 and the pressurizing chamber 74 when seal 56 is positioned rearwardly of that port. The communication of ports 70 and 72 with the rear reservoir compartment is controlled by a quick take-up valve arrangement such as any of those disclosed in U.S. Pat. Nos. 4,373,333 issued Feb. 15, 1983; 4,445,333 issued May 1, 1984; and 4,498,299 issued Feb. 12, 1985; by way of example. Such well-known valve arrangements are not further disclosed, but are incorporated herein by reference.

Chamber 74 is in the part of bore 34 axially between the primary piston 40 and the secondary piston 42, and is the chamber in which hydraulic brake fluid is pressurized for brake circuit 14. It is commonly known as the primary pressurizing chamber. A port 76 in the forward upper end of chamber 74 has brake circuit 14 connected thereto to permit brake fluid to flow from the chamber 74 into circuit 14 as brake fluid is being pressurized in that chamber, and to return from circuit 14 into chamber 74 as the primary piston 40 is moved rearwardly for brake release. As is well known, when piston 40 moves rearwardly so that the volume of chamber 74 increases at a faster rate than it can be filled by brake fluid from circuit 14, brake fluid from reservoir compartment 30 will flow via port 70 and chamber 48 past piston land 52 and the annular lip of seal 56 into chamber 74. When the lip of seal 56 clears port 72, the pressure in chamber 74 and reservoir compartment 30 will be equalized through port 72.

Secondary piston 42 has a rear land 80 provided with a circumferential groove 82 in which the V-block seal 84 is received. That seal is so oriented that it seals any pressure in chamber 74 that is greater than the pressure on the other side of the seal from that chamber, while acting somewhat like a check valve (as does the lip of seal 56) to permit fluid flow past the outer periphery of land 80 into chamber 74 should the pressure on the forward side of seal 84 be greater than the pressure in chamber 74.

Piston 42 has a smaller diameter main body portion 86 extending from piston land 80 to a forward piston land 88. Land 88 has a circumferential groove 90 in which another V-block seal 92 is received. Land 88 and seal 92 separate the annular chamber 94 between lands 80 and 88 from the secondary pressurizing chamber 96 located at the forward end of bore 34. Seal 92 is oriented so that it seals any pressure in chamber 96 which is greater that the pressure in chamber 94. A port 98 positioned at the forward upper end of chamber 96 is connected with brake circuit 16 and functions in a similar manner for brake circuit 16 and chamber 96 as does port 76 for brake circuit 14 and chamber 74.

Secondary piston main body portion 86 has a cross passage 100 formed through it where land 80 joins the main body portion. An axially extending bore 102 is provided in piston main body portion 86, open at its forward end 104 and connecting at its rearward end with passage 100. Another cross passage 106 is formed in main body portion 86 axially between land 88 and cross passage 100, intersecting bore 102. A retainer pin 108, shown here as a roll pin, is pressed into one side of passage 106 so that its inner end 110 extends into bore 102 to retain the center compensating valve retainer 112 to be described. An annular groove 114 is formed in the forward face of land 88, and is radially outward of bore end 104 and radially inward of the outer circumference of land 88. The forward face of land 88 has a spring locating boss 116 formed to extend slightly forward, boss 116 having a somewhat larger radius than the maximum radius of groove 114.

The center compensating valve retainer 112 has a land 118 axially located near the axial center thereof, so that there is a rearwardly extending pin part 120 and a forwardly extending pin part 122. Pin part 120 has a reduced diameter portion 124 and normally extends into bore 102 so that, when retainer pin 108 is installed, pin end 110 is within the reduced diameter portion 124 and limits the axially outward movement of pin part 120 in bore 102. Pin part 120 is sufficiently smaller in diameter than bore 102 to permit fluid flow through the annular space 126 formed by the pin part and the bore.

Center compensating valve retainer 112 also has a cylindrically formed annular lip 128 which acts as a valve member. Lip 128 is nested in and extends into groove 114 in radially spaced relation so that fluid may flow around the lip within the groove as it flows between the annular space 126 and the secondary pressurizing chamber 96. An O-ring 130 is positioned in the bottom of groove 114 and forms a valve seat which may be engaged by lip 128 when the valve retainer 112 is positioned sufficiently rearward so as to seal off the fluid flow interconnection between annular space 126 and the secondary pressurizing chamber 96.

Land 118 is substantially smaller in diameter than is chamber 96, and is formed to provide a spring seat on its forward side which is radially larger than forward pin part 122 but smaller than the outer diameter of the land. The forward end of pin part 122 has a spring seat and retainer 132 secured thereto by screw 134. Inner and outer secondary springs 136 and 138 are concentrically arranged in chamber 96, with their forward ends seated on and retained by spring seat and retainer 132. The rearward end of inner secondary spring 136 is seated on the spring seat formed on the forward side of land 118. The rearward end of the outer secondary spring 138 is seated on the spring seat formed by boss 116 on the forward face of land 88. Spring 138 therefore is radially outward of retainer land 118 but radially inward of the wall of bore 34. Spring 138 is the secondary piston return spring, and thus acts on the secondary piston 42, continually urging it rearwardly.

Spring 136 acts on the center compensating valve retainer 112 to resist the forward movement of its lip 128 in the direction away from O-ring 130. It has preload in the rest position shown, but it does not urge lip 128 to move so far as to close off the center compensating valve formed by that lip and O-ring because of the restraint of the screw 134. It preferably fits tightly around its spring seat on land 118 so as to hold the valve member 128 in this position when the master cylinder is at rest.

The master cylinder assembly is shown in the rest or fully released position in the drawing. When it is actuated by force exerted by the master cylinder operator, indicated by arrow 12, on primary piston 40, that piston moves forwardly (leftwardly in the drawing). Some of this force generates quick take-up pressure in chamber 48, as is well known in the art and disclosed in greater detail in the above-noted quick take-up valve arrangement patents, causing a relatively large brake fluid flow past seal 56 into chamber 74 and brake circuit 14 to quickly move the disc brake pads into contact with the discs to be braked. Some of the force also acts against the primary piston return spring 64. The spring rate of that spring is somewhat greater than the spring rate of secondary piston return spring 138, so that some of the actuating force is transmitted through spring 64 to secondary piston 42. This begins to move secondary piston 42 forwardly.

Initial forward movement of piston 40 causes the lip of seal 56 to pass beyond the by-pass port 72 so that further movement of piston 40 will begin further pressurizing the brake fluid in chamber 74 above the relatively low quick take-up pressure first generated. At the same time, the quick take-up valve arrangement as found in the patents noted above opens communication to reservoir compartment 30 from chamber 48 so that fluid in that chamber is thereafter displaced into the reservoir compartment and provides no substantial resistance to further actuating movement of the piston 40.

The brake actuating pressure built up in chamber 74 is delivered to brake circuit 14. It also acts on the rear face of secondary piston 42, and particularly its rear land 80. As piston 42 is moved forwardly, spring 138 is compressed and the valve lip 128 is engaged by O-ring 130, closing off the center compensation valve. Further leftward movement of piston 42 carries the center compensating valve retainer 112 with it, also compressing inner spring 136. This piston movement pressurizes the brake fluid in chamber 96 and provides brake actuating pressure in brake circuit 16.

Upon release of the master cylinder, secondary springs 136 and 138 and primary spring 64 urge their pistons rearwardly, as do the pressures in the brake circuits and the pressurizing chambers. When inner secondary spring 136 reaches the position where it is lightly preloaded, it holds the center compensating valve retainer 112 in the axial position shown in the drawing while piston 42 moves a little further rightwardly. This moves O-ring valve seat 130 away from lip valve member 128, opening the center compensating valve and permitting flow of brake fluid from chamber 96 past the lip 128 into the annular space 126, through the cross passages 100 and 106 into chamber 94, and out of that chamber to the front reservoir compartment through the front compensating port 142. At about the same time, the lip of seal 56 has moved rearwardly of rear bypass port 72, and any remaining pressure in chamber 74 is relieved. The master cylinder is then in the rest position illustrated. There is fluid communication available between the reservoir and the pressurizing chambers and the brake circuits for compensation purposes.

When the secondary piston is caused to move rapidly back and forth in bore 34 by the actuation of a wheel lock control, for example, the seal 92 no longer passes back and forth over a bypass hole and therefore is not subjected to and possibly damaged by often repeated extrusion into such a hole. This is particularly important when a wheel lock control arrangement is used, because the pressure in secondary chamber 96 under such conditions is commonly much greater that the reservoir pressure, increasing the need for protection against such extrusion.

The embodiments of the invention in which an exclusive property or privilege is claimed are defined as follows:

1. In a master cylinder assembly having a master cylinder body with a bore therein, a brake fluid reservoir, a primary pressurizing piston and a secondary pressurizing piston defining with the wall of the bore and the pistons a primary pressurizing chamber adapted to be connected to a first brake circuit and a secondary pressurizing chamber adapted to be connected to a second brake circuit for brake actuation and release, and a primary and a secondary piston return spring preloaded and respectively acting on the primary and secondary pressurizing pistons to continually urge those pistons to the master cylinder fully released or rest position; the improvement comprising:

a compensating bypass valve having a first valve element on said secondary piston positioned radially inward of the bore wall, a second valve element supported on said secondary piston for limited movements coaxially therewith and for limited movements relative to said first valve element, passage means including said compensating bypass valve and said secondary pressurizing chamber connecting the second brake circuit and the interior of the reservoir with fluid communication through said passage means being controlled by the closing and opening of said secondary compensating bypass valve, said second piston having a bore forming a portion of said passage means and said second valve element having a pin part inserted within said second piston bore, and said second piston having a groove with an inserted O-ring and said second valve element having a lip member insertable within said second piston groove and wherein fluid communication is governed by contact of said lip with said O-rings, and an inner secondary spring acting on said second valve element to urge it axially toward a position relative to said first valve element at which when said master cylinder is at rest said valve elements are spaced apart so as to keep said passage means open, said secondary pressurizing piston being moved upon initial secondary piston actuating movement against the force of said secondary return spring to engage said first and second valve elements and close said passage means, with further secondary piston actuating movement compressing said secondary piston return spring and said inner secondary spring and pressurizing brake fluid in said secondary pressurizing chamber, said first valve element upon release of said master cylinder occurring being moved axially away from said second valve element by movement of said secondary piston to its released position so as to open said valve and thus open said passage means and permit fluid flow between said second brake circuit and the interior of the reservoir while said master cylinder remains in the fully released rest position.

2. For use in an actuatable and releasable master cylinder, a master cylinder pressurizing piston assembly including a piston main body having compensating passage means therein adapted to selectively conduct brake fluid between a brake fluid reservoir and a pressurizing chamber in which brake fluid is selectively pressurizable and releasable by axial master cylinder actuating and releasing movements of said piston assembly, a selectively open and closed compensating valve controlling said passage means and including a first valve element on said piston main body and a second valve element mounted on said piston main body for axial movements at selected times relative thereto and at selected times therewith, said piston main body having a bore forming a portion of said passage means and said second valve element having a pin part inserted within said piston main body bore, and said piston having a groove with an inserted O-ring and said second valve element having a lip member insertable within said piston groove and wherein fluid communication is governed by contact of said lip with said O-ring, means acting on said piston main body and said second valve element resiliently holding said second valve element axially spaced from said first valve element during a master cylinder released position of said piston assembly, said last named means being overcome by master cylinder actuating movement of said piston main body to first permit said first valve element to be moved into sealing engagement with said second valve element to close said valve and thus close said passage means during master cylinder actuating movement of said piston assembly and thereafter permit concurrent further axial actuating movements of said piston main body and said second valve element with further actuating movements of said piston assembly, said means acting on said piston main body and said second valve element further acting as said master cylinder piston assembly is moved to the master cylinder released position to move said first valve element axially away from said second valve element and reopen said compensating passage means.

3. An appartus as described in claim 2 wherein said piston main body groove nests said lip of said first valve body when said piston is in a released position.

* * * * *